Oct. 1, 1963
R. M. BRICK ETAL
3,105,296
ART OF PRODUCING EXPANDABLE LAMINATE STRIPS WITH USE
OF FLATTENED TUBES FOR CORES
Filed Aug. 26, 1959
7 Sheets-Sheet 1
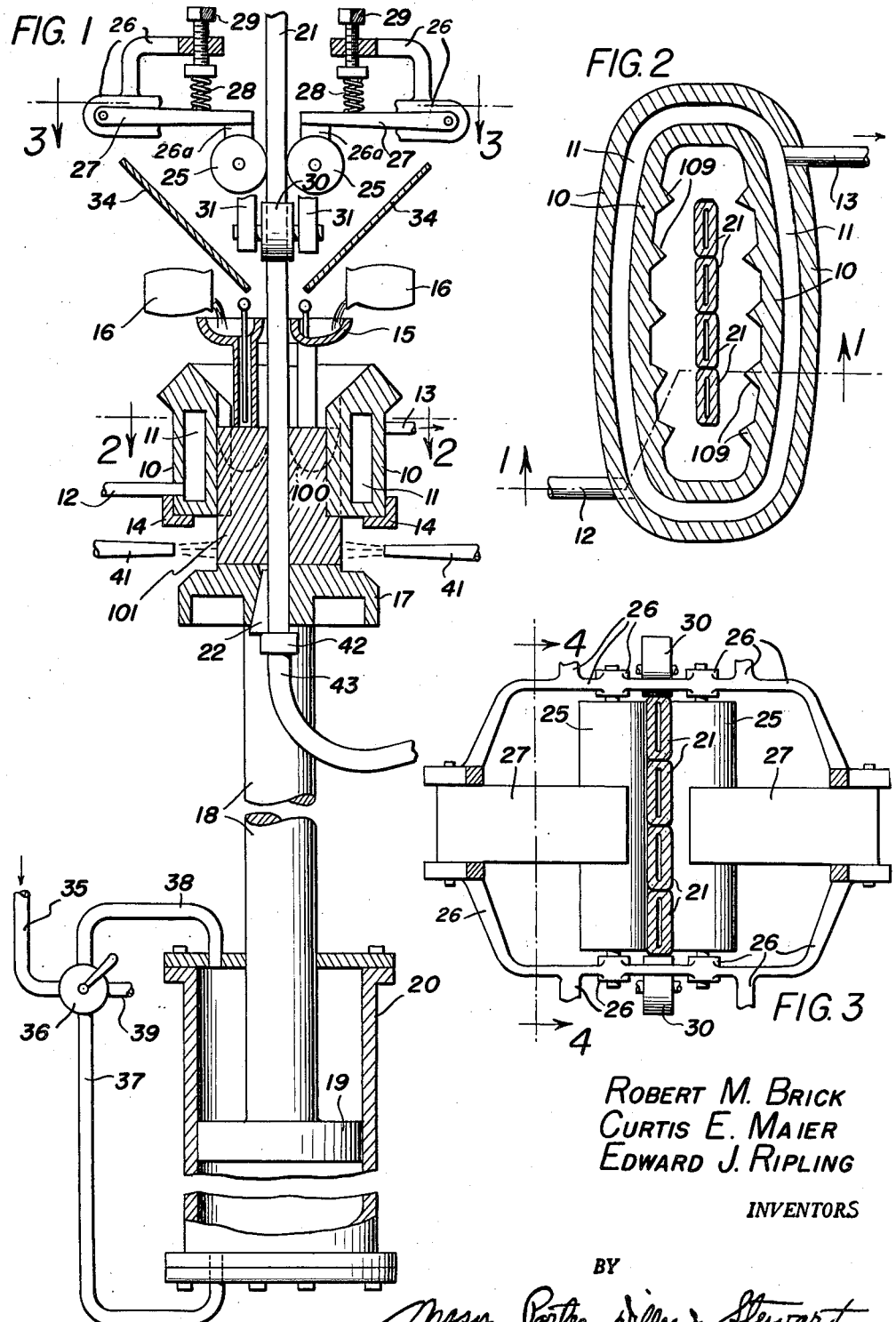
Robert M. Brick
Curtis E. Maier
Edward J. Ripling
INVENTORS
BY
Mason, Porter, Diller & Stewart
ATTORNEYS

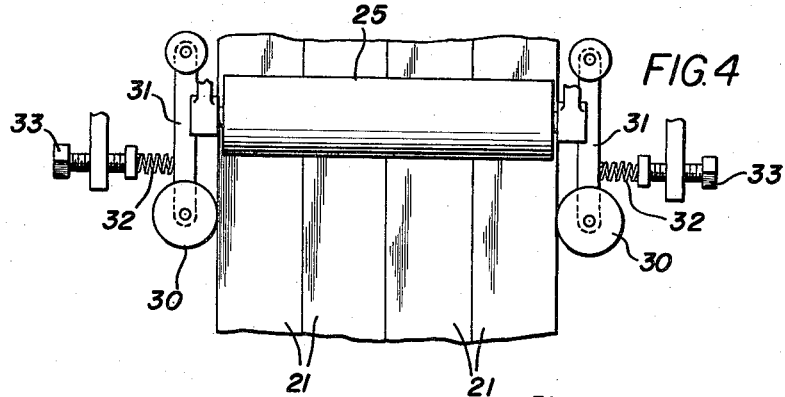
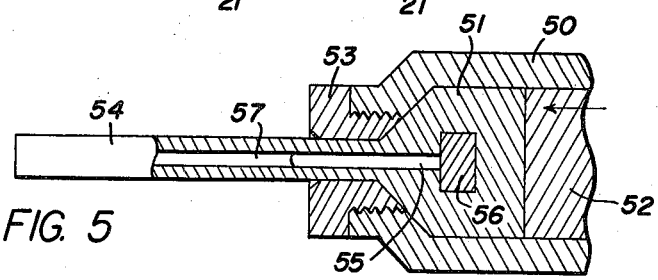
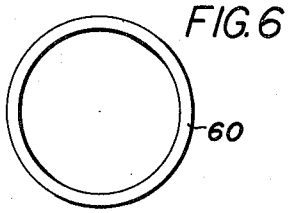
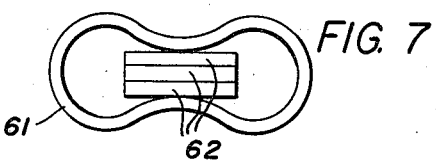
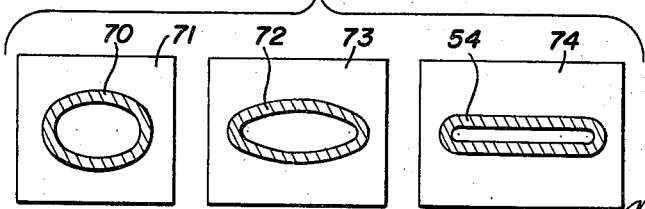

Oct. 1, 1963    R. M. BRICK ETAL    3,105,296
ART OF PRODUCING EXPANDABLE LAMINATE STRIPS WITH USE
OF FLATTENED TUBES FOR CORES
Filed Aug. 26, 1959    7 Sheets-Sheet 3
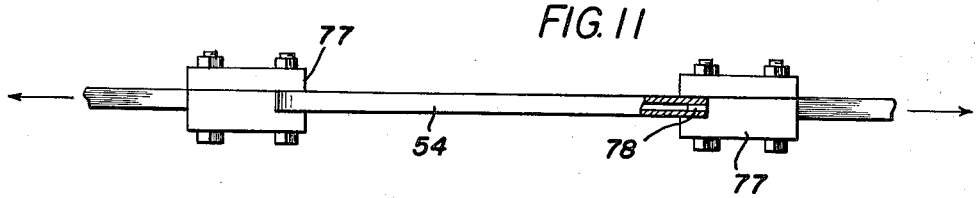
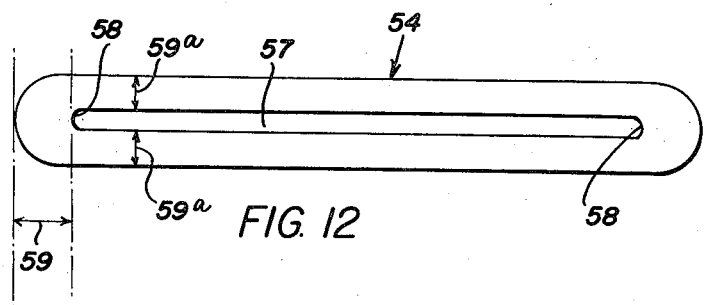
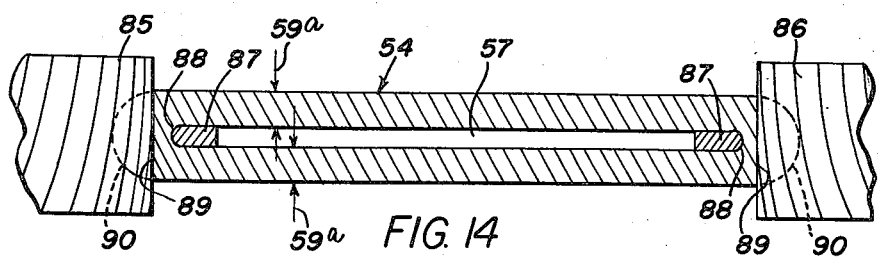
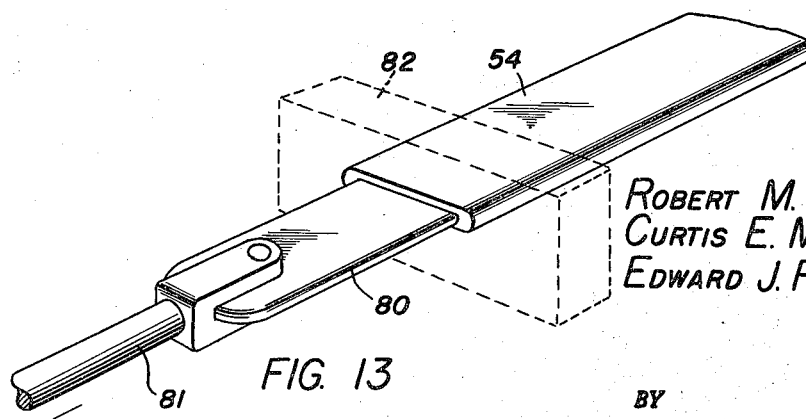
ROBERT M. BRICK
CURTIS E. MAIER
EDWARD J. RIPLING
INVENTORS
BY
Mason, Porter, Diller & Stewart
ATTORNEYS

ROBERT M. BRICK
CURTIS E. MAIER
EDWARD J. RIPLING
INVENTORS

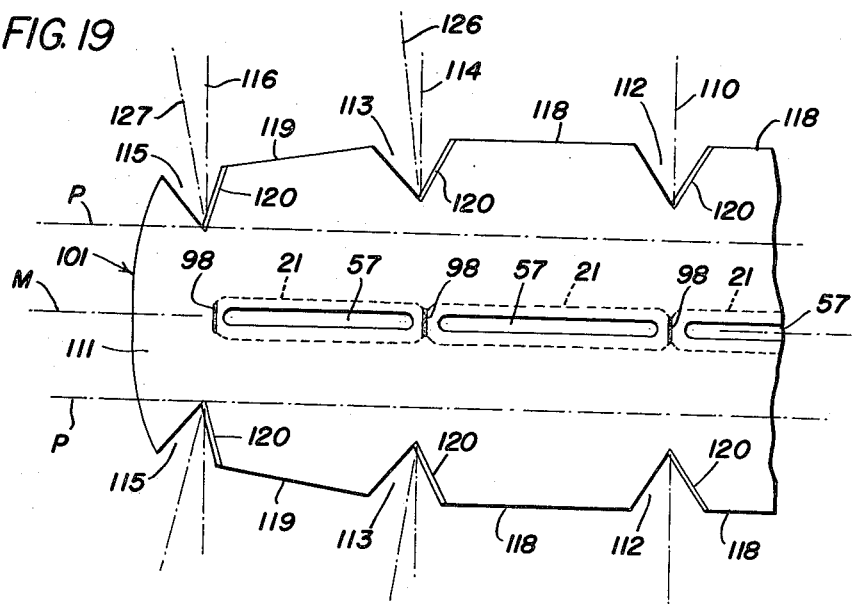
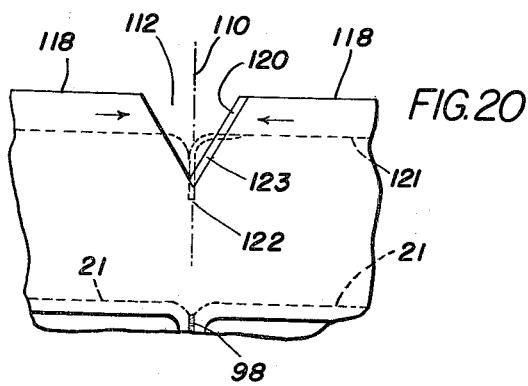
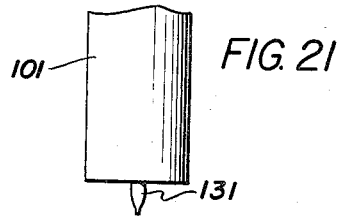
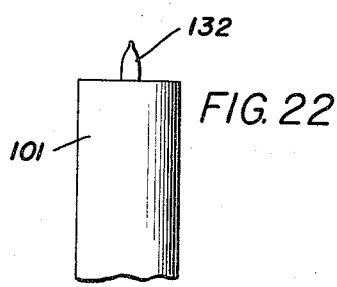

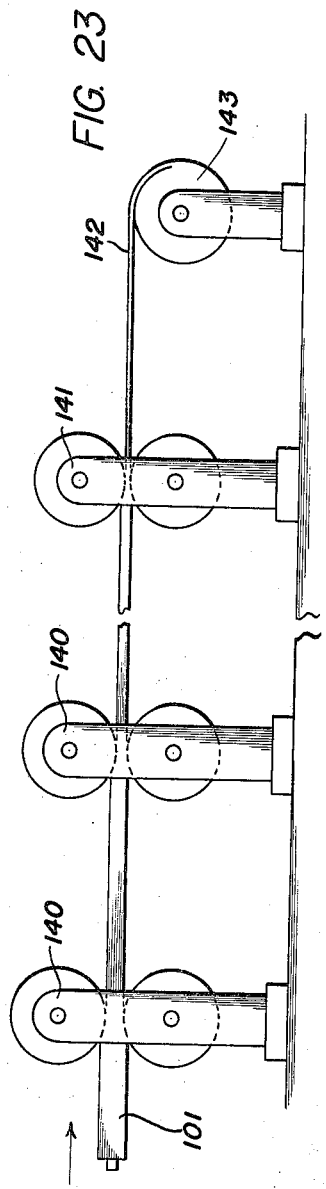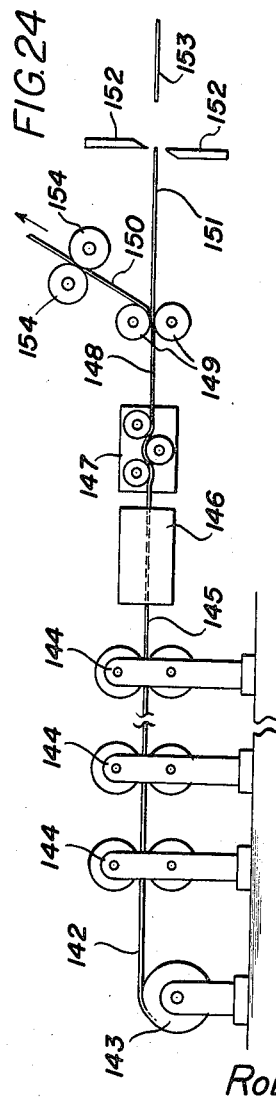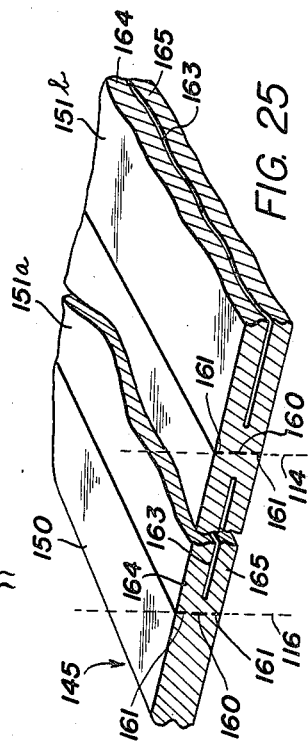

Oct. 1, 1963
R. M. BRICK ETAL
3,105,296
ART OF PRODUCING EXPANDABLE LAMINATE STRIPS WITH USE
OF FLATTENED TUBES FOR CORES
Filed Aug. 26, 1959
7 Sheets-Sheet 7
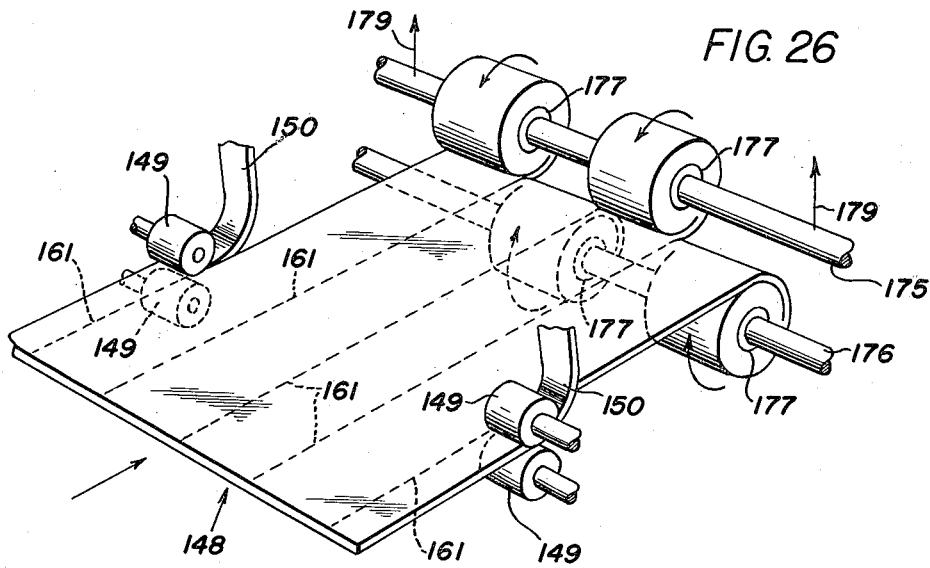
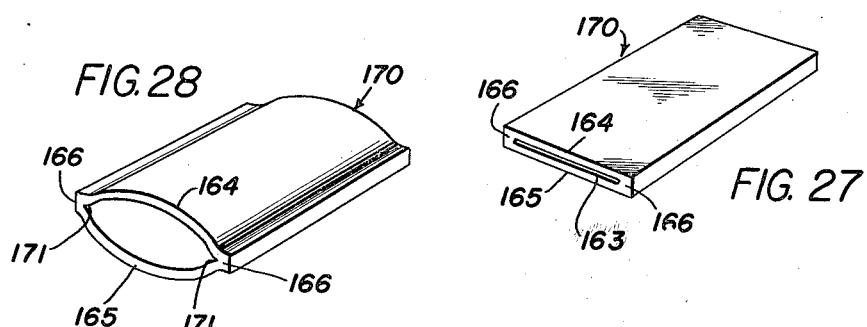
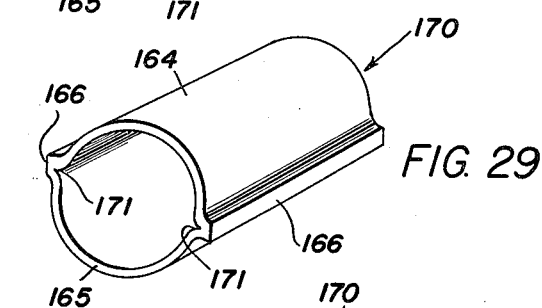
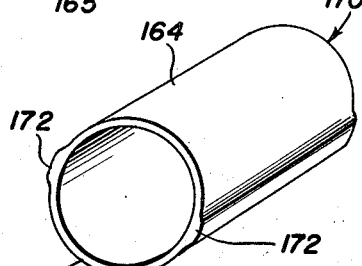
ROBERT M. BRICK
CURTIS E. MAIER
EDWARD J. RIPLING
INVENTORS
BY
Mason, Porter, Diller & Stewart
ATTORNEYS

United States Patent Office 3,105,296
Patented Oct. 1, 1963

3,105,296
ART OF PRODUCING EXPANDABLE LAMINATE STRIPS WITH USE OF FLATTENED TUBES FOR CORES
Robert M. Brick, Hinsdale, Curtis E. Maier, Riverside, and Edward J. Ripling, Flossmoor, Ill., assignors to Continental Can Company, Inc., New York, N.Y., a corporation of New York
Filed Aug. 26, 1959, Ser. No. 836,116
20 Claims. (Cl. 29—528)

This invention relates to the production of tubes by the expansion or opening out of a laminate strip material, and is more particularly concerned with the making of such laminate strip material.

It has been proposed in the prior art, for example, in the Marshall Patents 377,316 and 377,317 of 1888, to make a laminate strip material by pouring molten metal into a mold which contains a core of resist or anti-welding material, and thereby forming an ingot having an internal longitudinally extending discontinuity occupied by the resist material. Such an ingot is then rolled to produce a laminate strip having its outer surfaces provided by the ingot metal, and having a thin internal layer formed by the residue of the resist material and located between the metal surface laminations. The surface laminations are then spread apart to form the tube, with the edges of the strip present as outwardly projecting fins. Such procedures are effective where the dimensions of the tube need not be critically restricted within close tolerances; but when the tubes are to be employed where accuracy of dimension is critical, the width of the resist residue and of the laminations in contact therewith must be kept within tolerances below, for example, 0.1 percent, when, for example, the production is of specific diameters or peripheral dimensions, or of container bodies which are to receive and be seamed to pre-formed ends.

Further, thick walls are not needed for many tubular shapes; and excess metal therein represents an economic loss. Correspondingly, the metal in the fins should be kept at a minimum; such external projections are usually unnecessary and often objectionable.

Many containers, e.g., cans, are of small diameters, such as 2 to 6 inches, and can be made from laminate strips having widths of say 3 to 9 inches for the residual layer of resist material. This is much less than the axial lengths of roll stands for rolling the ingots into the strips; and hence economically an ingot can be provided with a number of discontinuities equal to the number of strips to be made, and then rolled as a "multi-wide" billet and strip, which is later split longitudinally into the "single-wide" strips, along severance lines at the metal which joins the laminations at the spaces between adjacent resist residue layers. Here, again, for economy, it is desirable that the amount of such spacer metal, and therewith its portion of the total width of the multi-wide strip, should be a minimum, so that wastage by trimming will be negligible or absent.

An object of the present invention is the preparation of ingots or billets having accurately spaced discontinuities therein, with these discontinuities of predetermined sizes and shapes within small tolerance limits.

Another object is the preparation of such ingots or billets with multiple discontinuities therein, and with pre-established longitudinal regions at which the resultant multi-wide strip can be accurately separated with pre-determined minimum fin portions thereon.

A further object is the preparation of such ingots or billets by the employment of pre-existent and accurately formed tubes for providing the discontinuities.

Illustrative embodiments of the invention are shown on the accompanying drawings, in which:

FIGURE 1 is an upright sectional view through a direct-chill casting apparatus for molding billets according to this invention, substantially on line 1—1 of FIGURE 2;

FIGURE 2 is a horizontal section, substantially on line 2—2 of FIGURE 1;

FIGURE 3 is a horizontal section, substantially on line 3—3 of FIGURE 1;

FIGURE 4 is a side elevation of a part of the apparatus, substantially on line 4—4 of FIGURE 2;

FIGURE 5 is a section through an extrusion apparatus for forming hollow cores according to this invention;

FIGURES 6 to 9 show successive steps in rolling a cylindrical tubing to flattened shape in making hollow cores;

FIGURE 10 shows successive operations of drawing hollow cores;

FIGURE 11 shows a tension straightening operation;

FIGURE 12 is a cross-section, on an enlarged scale, of a hollow core;

FIGURE 13 is a perspective view, showing an internal sizing operation upon a hollow core;

FIGURE 14 is a cross-sectional view of a hollow core, on the enlarged scale of FIGURE 12, showing a trimming of the outer edges;

FIGURE 19 is an end view of a part of an ingot ready for rolling;

FIGURE 20 is a diagram showing the relative movement of parts of an ingot during early rolling;

FIGURE 21 shows the filling of ingot cores with a resist material;

FIGURE 22 shows the closing of the filled ingot cores;

FIGURE 23 shows hot rolling of the ingot to produce a hot rolled laminate strip;

FIGURE 24 shows the cold rolling of the laminate strip, the removal of edge portions, and cutting into sheets;

FIGURE 25 is a perspective view, on a greatly enlarged scale, of parts of the cold rolled multi-wide strip;

FIGURE 26 is a perspective view, showing a multi-wide strip being longitudinally severed and wound into coils of single-wide strips;

FIGURE 27 is a perspective view of a single-wide or unit piece from the multi-wide strip of FIGURE 25;

FIGURE 28 is a perspective view showing a partial opening or expansion of the piece shown in FIGURE 27;

FIGURE 29 is a perspective view showing the expansion of the piece of FIGURES 27 and 28, to circular cylindrical form;

FIGURE 30 is a perspective view of a tubular body, corresponding to FIGURE 29, in which the projecting fins have been reduced.

Figure 15:
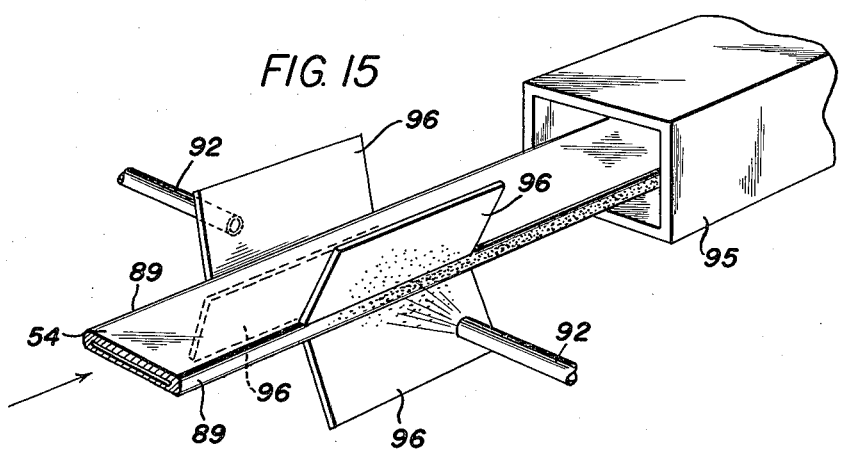
FIGURE 15 is a conventionalized view showing the application of coatings to a hollow core.

The casting apparatus in FIGURE 1 is conventionalized and with parts broken away for clearness of showing; and has the mold 10 with water passages 11 in its walls, to which cooling water may be brought by the conduit 12 and removed by conduit 13. The mold 10 is illustratively supported by the rails 14. A tundish 15 is provided at the upper end of the mold, for receiving the molten ingot metal from the pouring ladles 16. At the start of a casting operation, the lower end of the mold 10 is closed by a platform 17 held in its upper position by a ram 18 and piston 19 in the cylinder 20. The platform has an opening for receiving the lower ends of the hollow cores 21; four such cores 21 being shown as abutting in a plane in FIGURE 2. A clamping member 22, illustratively a wedge, fixes the lower ends of the cores 21 to the platform and restricts initial flow of molten metal below the platform top. Such hollow cores are preferably of an internal shape having flat opposed surfaces joined at their edges by surfaces of semi-circular shape; and of an oblong shape for the external cross-section.

Above the mold 10 are provided the pinch rolls 25 which engage the opposite outer faces of the oblong cores 21, FIGURE 3, and hold these in plane. During casting, the platform 17 is moved downward, therewith pulling the cores 21 downward, and causing rotation of the pinch rolls 25 journaled on a frame structure 26. These rolls 25 are provided with brakes 26a to restrict their rotations, so that a tension is exerted along the cores 21 between the platform 17 and the rolls 25 initially, and later between these rolls and the upper hardened surface of the ingot being formed, for holding the cores 21 straight even under conditions of thermal expansion. Illustratively, the brakes 26a are on levers 27 which are urged toward the rolls 25 by springs 28, the spring action being adjustable by screws 29. The abutment of the cores 21 in their plane is assured by rollers 30 (FIGS. 1, 3 and 4) engaging their edges and mounted on rock arms 31 pressed by springs 32 of effort adjustable by screws 33. Heat shields 34 may be positioned above the tundish 15 and below the top guide roller structures.

The piston 19 may be moved in the cylinder 20, and its rate of movement controlled, by pressure fluid delivered by conduit 35 to a valve 36 which causes the fluid to move by conduit 37 to the cylinder space beneath the piston when the platform is to be raised or held in raised position; or by conduit 38 to the cylinder space above the piston when a positive downward motion, independent of the ingot weight, is to be imposed on the platform: noting that at each position of the valve, the conduit not being supplied with pressure fluid is permitted to vent to a discharge 39. When a tundish is provided above the mold, with discharge therefrom into the mold controlled by valving stopper rod means which are raised when the molten liquid level attains a desirable height, and lowered when the ingot descends faster than the molten liquid entry, the descent of the platform can be determined by the valve 36 to give an essentially uniform rate at which the metal solidifies during its downward movement in the mold: such devices are well known to those skilled in the art.

In FIGURE 1, the platform 17 is shown in a slightly lowered position, with the lower part of the ingot 101 having solidified and passed below the lower edges of the mold 10. Cooling of the ingot can be assisted by water sprays from nozzles 41. Cooling can also be assisted by forcing a cooling medium, such as air, through the hollow cores: for which purpose a manifold header 42 can be sealed to the lower ends of the cores, and supplied with the cooling fluid by a flexible conduit 43.

The hollow cores 21 may be made by extrusion as shown in FIGURE 5. The extrusion cylinder 50 has a heated mass 51 of the core metal, and the piston 52 forces this metal through the shaping head 53 which has an oblong opening so that the external shape of the emerging extruded core stock 54 is an oblong, e.g., as in FIGURE 12. A fixed mandrel 55 held by the cross arm 56 in the cylinder 50 extends through the head 53, so that the stock 54 is hollow, with the cavity 57 of the size and shape provided by the mandrel, e.g., with rounded ends 58 as in FIGURE 12. It is preferred to have the metal thickness 59 at the edges of the core, between the outer surface and the surface of the cavity 55 greater than the thickness 59a of the lamination portions of the metal, to give stiffness to the stock during extrusion and handling and to provide metal for the trimming operation described hereinafter.

An alternative method of forming the hollow cores 21 is shown in FIGS. 6–9. Here, a round tubing 60 is passed between rollers to partly crush it to a dumb-bell cross-section 61. A bar of material less ductile than the tubing material is then placed in it (FIG. 1) e.g., three stainless steel strips 62 are then inserted, and then the tubing is rolled again to a cross-section 63 (FIG. 8) at which the tube has widened but the edges of the outer strips 62 have not indented the inner surface of the tubing: therewith parts of the inner surface are brought against the polished exposed surfaces of the outer strips 62. The middle strip 62 is then pulled out, noting that this demands no sliding along the inner surface of the tube but gives space so that the outer strips 62 can now be withdrawn without sticking. A second set 64 of steel strips, which are wider, are inserted (FIG. 8) by a reverse operation, and a further rolling accomplished. This can be repeated one or more times, until the original tubing 60 has been flattened to the shape 65 (FIG. 9) with flat opposite inner surfaces with smooth surface finishes from the insert strips, and with the ends of the internal cross-section as curves which smoothly merge with the flat surfaces. For example, the strips 62 may be 0.035 inch thick, and the final set of strips may be about 0.042 inch thick when the hollow channel is to have a corresponding dimension of 0.125 inch. The wall thickness of the original tubing 60 can remain essentially unchanged during the flattening; or the wall thickness can be reduced during the flattening, e.g., a tube of original ½ inch wall thickness can be reduced so that the thicknesses 59a, FIGURE 12, are about ⅛ inch each, wherewith the original thickness 59, FIGURE 12, is essentially maintained at the ends, and upon trimming, FIGURE 14, the external outline is essentially that of four planes.

A tubing can also be reduced to the flattened shape of FIGURE 12 by drawing through dies. Thus, in FIGURE 10, a tubing of original circular section becomes an ellipse 70 upon drawing through die 71; and this ellipse is flattened further toward a shape 72 in die 73; and a final die 74 gives the tubing section 54, as in FIGURE 12. It will be understood that the number of dies can be varied from the illustrative three, with the successive passes serving to bring the tubing stepwise to the intended shape.

If the lengths of stock 54 are not straight, straightening can be effected as in FIGURE 11, by gripping the ends in clamps 77 and exerting tension as indicated by the arrows. Therewith, the internal cavity is preserved over the major portion of the stock: and tongues 78 may be provided on the clamps, to enter one or both ends of the stock 54 to keep the cavity end or ends open.

For accurate economic manufacture of tubing as container bodies, none of the methods of producing the hollow cores, as in FIGURES 5 to 9, is sufficiently accurate so that the product can be produced on a quantity basis without the expense of individual calipering and discard of off-sizes. According to this invention in, producing the accurately-sized cores which will generate accurately sized tubes, further operations are performed thereon.

As shown in FIGURE 13, a sizing tool 80 is introduced into the cavity of a piece 54 of the hollow core stock, and pulled through by the tension bar 81 while the movement of the piece 54 is prevented by the slotted stop bar 82 shown in dotted lines. Such sizing tools can be broaches 80 made as steel strips thinner, narrower and longer than the length of the piece 54; and provided with teeth at the edges which have shapes corresponding to the desired shape of the cavity edge and are successively and oppositely set to widen the cavity, the final teeth giving the cavity the intended shape and dimension from side to side. Alternatively, the sizing tool 80 may have a stretching and burnishing head which is drawn through the tube to size and polish its interior, with due allowance for elastic spring-back. In practice, highly accurate tubes can be made when the lateral dimension of the cavity is thus closely controlled, whereas the vertical dimension of the cavity 57 in FIGURES 12 and 14 need not be to close tolerance.

It will be understood that the invention also comprises other combinations of the steps. Thus, a flat tube may be extruded as in FIGURE 5, and then drawn through a mandrel, as in FIGURE 10, having an aperture of the size and shape to give the predetermined internal cross-section, due allowance being made for elastic spring-back.

The spacing of the cavities of adjacent cores 21, in their plane, FIGURE 2, determines the amount of metal present in the projecting fins of the expanded tubes: and also is a factor in determining the lateral spreading during rolling. Accordingly, according to this invention, this spacing is closely controlled, by trimming the edges of the cores 21. In FIGURE 14, this trimming is being accomplished by milling cutters 85, 86 rotating about parallel axes. The position of each cutter relative to the core stock piece 54 is determined by respective fingers 87 at each end of the straightened and broached piece, i.e., with its cavity 57 now having accurately shaped and parallel edge surfaces 88 for engagement by the fingers 87. Therewith the cutters dress the edges of the stock 54 along parallel planes represented by the line 89, FIGURE 14, removing the metal shown in outline by the dotted lines 90. The distance of these planes from the adjacent inner edge 88 is determined as half of the metal spacer structure to be present between adjacent discontinuities in the ingot; and can be less than the thickness 59a of the metal laminations in the core stock 54.

Figure 16:
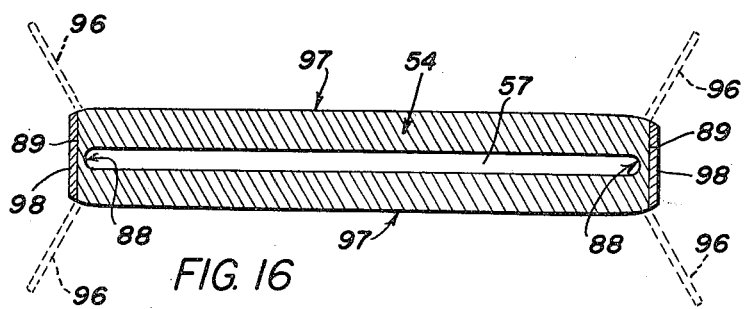
FIGURE 16 is a cross-sectional view of a core, on the scale of FIGURE 12, showing the coatings thereon.

The core stock 54 is then preferably given external coatings which prevent welding. In FIGURE 15, the core stock 54 is moved in the direction of the arrow between nozzles 92 which discharge an anti-welding material against the machined edge surfaces 89 of FIGURE 14, and then moves through a drier 95 when the nozzles deliver a water-borne slurry for example. Masks 96 can be employed to prevent deposit of resist upon surfaces which should not be coated therewith, e.g., by locating such masks 96 as indicated in FIGURE 16. The stock now has adherent coatings, as shown in FIGURE 16, comprising the anti-weld material at the regions 98 while the surfaces 97 are free for weld-bonding to the ingot metal during casting and rolling.

As examples of practice, the hollow cores may be made of aluminum or aluminum alloy such as the metals known commercially as 2S or 1100, 1190, 3003, and 1% zinc alloy. The wall thickness of the laminations of the flattened shape should be about 5 to 10 percent of half the thickness of the ingot: for example, an ingot which is 8 inches thick will have a half-thickness at lamination-producing regions of 4 inches less half the core thickness, that is, the cores 21 after flattening should have a wall thickness of 0.20 to 0.40 inch. The trimming at edge surfaces 89 then can leave the distance of such surfaces to the edge 88 of the cavity about 1/16 inch, wherewith the spacing between two adjacent cavities or discontinuities when the cores 21 abut at their edges, will be about 0.127 to 0.130 inch: noting that the separating resist 98 may be present upon one or both of the edge surfaces 89, and its thickness is taken into account in trimming for the surfaces 89. The cavity in each core can be about 3/16 inch. For a can body with an internal diameter of about 3 inches, and an internal perimeter of 9.5 inches, the width of the core cavity 57 between the side edges 88 can be about 4.5 to 4.6 inches, thus giving allowance for lateral spreading during rolling.

In pouring an ingot, four such stock strips 54 can be employed, each about 14 to 18 feet long for producing an ingot correspondingly 13½ to 17½ feet long. These strips are then mounted as cores 21, FIGURES 1–4, by inserting the lower ends into the platform 17, assuring edge abutment of the cores 21 for their lengths and their guidance by rolls 25, 30, and clamping them by the block 22. The cooling connection 42, 43 is made, and the platform 17 checked or lifted so that it closes the lower end of the mold 10, which may be 8 to 12 inches deep, for example. Metal is now poured from crucibles 16, with care to keep the level and temperature essentially uniform at all sides of the cores 21. The molten metal is quickly chilled from the mold walls, the platform, and the cores: and at a desirable rate of pouring, the lower part of the ingot 101 has solidified by the time the liquid level is about 2 inches from the top of the mold. The valve 36 is operated, so that the platform 17 is started into downward travel at a rate corresponding to the rate of pouring the metal into the mold, so the liquid level remains substantially constant. The pouring rate and descent rate for the platform are correlated: and depend upon mold dimensions, the metal being cast, its temperature at entry, the rate of water, etc., cooling of the mold, and cores, etc. In practice, the metal passes toward a solid state more rapidly adjacent the cooled surfaces, so that a curved surface 100, FIGURE 1, represents a boundary between fluid and stiffened phases.

As the platform 17 moves down, the ingot 101 emerges from the mold 10; and its further cooling may be accelerated by the water sprays against its surface, and by the passage of cooling fluid through the cores 21. The cores 21 are held straight by tension, due to the action of brakes 26 on the guiding pinch rolls 25.

The entering molten metal contacts the exposed surfaces of the cores 21. On the other hand the abutment of the edges of the cores, at the resist materials 98, prevents entry of molten metal between them: and the resist itself prevents any sticking or adhesion of adjacent cores directly to one another along such abutment surfaces. The resist material coatings 98 at the outer and exposed edges of the outer two cores also prevent the molten metal from welding to these outer cores at such edges.

The ingot 101 increases in length, moving downward with the platform 17 and the cores 21. Therewith the positions of the cores become fixed as the ingot metal hardens. When the cores 21 leave the rolls 25, 30, the pouring from pots 16 is stopped, the molten metal permitted to harden, and the platform 17 lowered until the completed ingot 101 is free of the mold 10. The clamp 22 is loosened, and the ingot 101 tilted and pulled from the platform. The platform 17 is raised again, a new set of cores 21 clamped in place, and the pouring of the succeeding ingot begun.

Figure 17:
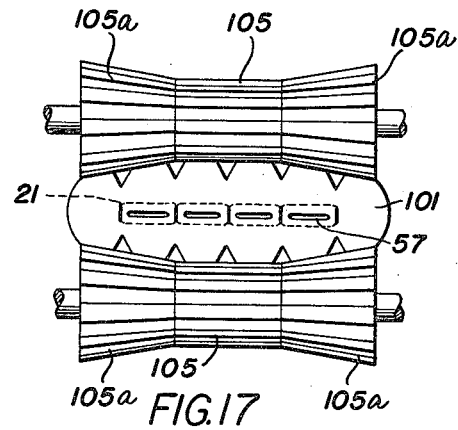
FIGURE 17 is a conventionalized view showing the scarfing of an ingot produced as in FIGURE 1.
Figure 18:
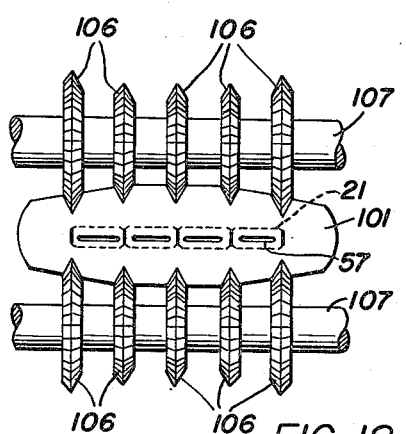
FIGURE 18 is a conventionalized view showing the trimming and truing of external longitudinal grooves in the ingot.

The ingot 101 for making accurately sized tubular bodies is subjected to a scalping operation, as by the milling cutters 105, 105a, FIGURE 17, to remove surface irregularities and to give surface contours which can act in determining the lateral spreading of the several cores: and then is passed between gangs of angular milling cutters 106 on arbors 107, FIGURE 18, for producing longitudinal external grooves or for dressing and correcting the shapes of such grooves when produced during casting, as by the projections 109 from the mold 10, FIGURE 2, by die pressing or coining, or by other mechanical operations.

A preferred external shaping of the ingot 101 is shown in FIGURE 19, where one lateral half of the ingot is shown, at one side of the upright longitudinal plane 110 at the center of width, with a minor part of the other half. The two halves are symmetrical at the sides of the plane 110. The exteriors of the cores 21 are shown in dotted lines, to indicate that they have become integrated with the body metal of the ingot during casting: each having a channel 57. The illustrative ingot has four such cores, but it will be understood that any number may be provided dependent upon the diameter of the tubular bodies to be produced and the width of the ingot which may be rolled upon the equipment: for example, if tubular bodies about 3 inches in internal diameter are to be made on a rolling stand having available roller lengths of 42 inches, and the rolling schedule produces a lateral spreading of one inch, the total ingot width can be 35 inches. This allows at each edge two or three inches for clearance; and an additional inch at each edge can be allowed for the ingot portion 111 which will provide removable lateral margins as set out hereinafter, the space available for cores is about 33 inches. The core channels 57 for producing tubular body strip blanks are about 4¾ inches wide, dependent on the metal and the rolling schedule: so that with spacings of 0.130 inch between adjacent channels 57, seven such cores can be present in the ingot and seven parallel longitudinal "single-wide" strips can be provided by rolling the ingot. If the available rolling stand has rolls 36 inches wide, with similar margin trimming, core channel spacings, percentage of lateral spread, and four cores in the ingot, tubular bodies about 4 inches in diameter can be produced.

In FIGURE 19, a pair of longitudinal external grooves 112 are provided, at the upright longitudinal plane 110, which also passes through the resist coating 98 between the two innermost cores 21. Second pairs 113 of longitudinal grooves are provided in each lateral half of the ingot, at a respective upright plane 114. Third pairs 115 of longitudinal grooves are provided in each half, at a respective upright plane 116. It is preferred to form these grooves of V-cross-section, and with angles of 8 to 90 degrees dependent upon the material, the diameters of the tubular bodies to be made, and the rolling schedule: the angles for all grooves of an ingot need not be the same. Angles of 40 to 70 degrees have been found satisfactory for most conditions.

The outer roll-engaged surfaces 118 of the ingot are referably parallel planes for parts thereof adjacent the center plane 110 and formed by the plain milling cutters 105: In FIGURE 19, such surfaces extend from the illustrated grooves 112 to the next-outward grooves 113, and assure regularity of the first rolling step by presenting, to the first set of rolls, surfaces which are engaged by those rolls and of sufficient width to avoid twisting of the ingot. The surfaces 119, between grooves 113 and the marginal grooves 115 converge toward the lateral edges, so that they are progressively reduced during the rolling: and are formed by angular cutters 105a ganged with the cutters 105.

Dependent upon the rolling schedule, the lateral spreading is greater at the median plane M than at the roll-contacted surfaces, and may be greater or less at the median plane M than at intermediate planes such as P, P. That is, dependent upon the material and the rolling schedule, the marginal cross-section may be a simple convex, a double convex with a median concave, or the like. In rolling aluminum alloys, the usual form is convex-concave-convex. The behavior of the billet material is known to the person skilled in the art, and a primary decision made as to the probable total spreading during the rolling schedule and therewith the shaping of the initial billet, subject to correction by modification of the schedule as to temperature and percentage reduction for later passes and to change of shaping for later billets. The instant procedure is adapted to control of the spreading and of proper location of notching weaknesses under different conditions of relative spreads at planes M and P. Furthermore, the spreading adjacent the edge of an ingot of uniform thickness is greater adjacent the lateral edge than at the center of width; so that with core channels 57 of originally identical horizontal dimensions, the cores adjacent the edges are spread more than those adjacent the center, and therewith the several individual single-wide strips will not produce tubular bodies of the same diameter. The provision of the external contouring by the convergent surfaces 119, and of the longitudinal grooves, permits compensation for this. During the initial rolling passes, the roll pressure is exerted at surfaces 118, so that the channels 57 near the center of width are widened more than the channels 57 near the edges: but during later rolling steps, the side channels are widened more than the central ones. Also, during the early rolling, the metal adjacent the rolled surfaces of the billet tends to spread laterally to close the grooves 112 and then the grooves 113, so that the spreading of the core channels 57 between the lines 110, 114 is reduced. As the rolling progresses, the metal adjacent the surfaces 119 also is moved laterally to close the grooves, so that the spreading of the core channels 57 between the lines 114, 116 is likewise reduced. Therewith, by the contouring and by control of local spreading, the amount of spreading of each core channel can be made identical during the scheduled rolling.

A function of the longitudinal grooves 112, 113, 115 is also to provide longitudinal weaknesses or notches in the rolled "multi-wide" strip, which in cooperation with the weaknesses established by the residues of the coatings 98, will permit severance of the multi-wide strip into the individual single-wide strips. To assist in this, it is preferred to coat at least one wall of each groove with a weld-preventing material, as a layer 120. A slurry of aluminum oxide, silica, or other weld-resisting material may be applied, with or without an included binder, and dried: resist materials may be sprayed on, e.g., by flame-spraying aluminum oxide, talc or other refractory, or by room temperature spraying of a slurry of weld-resisting material. A sooty oxy-acetylene flame may be directed against the surface to be coated. A weld-preventing coating can be provided by heating the billet, and passing a rod of a metal stearate, an epoxide resin, or a polysiloxane along the surface to be coated: an anti-welding layer may likewise be formed by squeezing a polysiloxane grease onto the surface. Such layers may be 0.001 to 0.030 inch thick. During the lateral spreading of metal, as described above, toward the grooves to close the same, the resist layers 120 are moved therewith, until the resist material is held in place by the abutting metal, as shown in FIGURE 20, where the behavior at a central groove 112 is shown. As the metal moves uniformly from both sides in the direction of the arrows, and the half-thickness of the billet is lessened by the reduction from surfaces 118 to surfaces 121, the resist material 120 adjacent the root of the groove moves inward to point 122, and overlying parts of the resist are successively engaged by the spreading metal, until the residue mass 123 is in the upright plane 110 and thus aligned with the resist coating 98. It will be noted that, due to the lateral flow of metal, the point 122 is a less distance below the original root of the groove, than the half-thickness reduction from plane 118 to plane 121.

Since the spreading at the median plane M, for this rolling schedule, is less than that at intermediate planes P, the metal and core material will spread more than metal at the roots of the longitudinal grooves. At the center of width, the roots of grooves 112 can be originally located in plane 110 which passes through the weld-preventing coating 98 between the two central cores; and this condition will continue during rolling. The roots of grooves 113 however will not travel as far, as an incident of lateral spreading, compared to the coatings 98 between central and lateral cores. Therefore, the upright planes 114 through the roots of grooves 113 do not pass, in the ingot, through the coatings 98 between such grooves, but are located relatively outside or toward the nearer ingot edge, as shown in FIGURE 19, compared to the positions of such coatings 98; so that the greater lateral spreading travel of the coatings 98 will bring these coatings to the planes 114 at the end of rolling, noting that these planes 114 will have an outward movement, as set out below. A like action occurs at grooves 115 and planes 116.

Further, the metal adjacent and intermediate plane P moves laterally farther than metal at the roll-contacted surface. Thus the roots of the non-central grooves 113, 115 will move laterally relative to the surface metal, particularly after the grooves have been closed upon the resist material: and such would occasion a progressive tilting of the resist material. To compensate for this, the noncentral grooves 113, 115 are pre-tilted during formation in the ingot; so that the bisectors 126, 127 of the root angles are not at right angles to the median plane M, and so that the bisectors 127 of the marginal grooves 115 are at a greater angle than the bisectors 126 of the grooves 113. Therewith, in closing upon the resist layers 120, the planes thereof are tilted during early rolling stages, but straighten as the metal adjacent the groove roots moves laterally more greatly than the metal at the surface: thus, in the course of the rolling schedule, the grooves are closed upon the resist material 120, and at the close of the schedule, the residues of the material 120 at each pair of grooves lie in a plane which passes through the residue of coating 98, as appears in FIGURE 25.

In practice, the compensation for different lateral spread can thus be provided by the contouring and the longitudinal grooves. If the rolling schedule is modified, for example, so that exact compensation is not attainable for the ingots with the prevailing scarfing and grooving apparatus, correction can be made by changing the angular milling cutters of FIGURE 17; or, preferably, by changing the groove milling cutters of FIGURE 18, possibly with adjustment of the depths of the grooves being cut or dressed. At least one-third of solid metal should be left at each pair of grooves after rolling, and it is preferred to have one-half of the total thickness in the billet comprised of solid metal, that is, the depths of the two grooves and the upright dimension of the coating 98 should not exceed one-half of the distance between the planes 118 with the usual rolling schedule.

The next operations are those shown in FIGURES 21 and 22. The hollow cores 21 are filled with an anti-welding or resist material shown as a bar or mass 130 provided for each of the core channels. Such anti-welding or resist material may be a powder such as aluminum oxide, zirconium oxide, titanium oxide or like material which will spread or distend in proportion to the lengthening of the ingot metal when the billet is rolled, so that throughout all steps of the rolling there is a remaining layer of resist material to prevent welding between the inner walls at the channel spaces. Sodium chloride and other salts which act plastically under hot rolling and easily crush and subdivide under cold rolling, can be employed. For another example, the resist material 110 may be introduced as a bar of polyethylene, in which case it is preferred to peen, crimp or weld one end 131 of each core into closed condition and to have the ingot 101 at a temperature above the melting point of the resist material, so that the same fills the channel of each core and thus fills all of the channels within the ingot. This filling can be done with the ingot in essentially vertical position as shown in FIGURE 21 with upper ends later being peened or welded shut, as shown at 132, FIGURE 22.

The ingot is now ready to be employed as a billet in a sequence or schedule of heating and rolling operation. It is preferred to employ firstly a heating or homogenizing which may be to a temperature of say 900 degrees F. with an aluminum or aluminum alloy ingot. It has been found that, at this temperature, and with the channels filled with polyethylene and sealed, that the polyethylene is present in a condition for ready extension during hot rolling. In FIGURE 23, the billet 101 is illustrated as passed through a number of hot rolling stands 140, whereby it is successively reduced in thickness, with a corresponding extension in length but with relatively minor widening. The rolling schedule of number of hot and cold passes, the temperature at each pass, and the percentage of reduction at each pass, is selected according to the material, the amount of contouring and notch tilting. In practice, the hot billet 101 cools during its passage through the successive stands, so that when it is operated on in the last hot rolling stand 141, the temperature has decreased to a range at which work hardening may be occurring. In such a case, the rolling schedule may be set for an intermediate annealing at the end of the hot rolling, or during the course of subsequent steps of cold rolling. This is illustratively shown in FIGURES 23 and 24 in which the strip 142 which issues from the roll stand 141 may have a thickness of say 0.100 inch between its opposite surfaces. This strip is then wound into a coil 143 which can be subjected to heating in an appropriate furnace to give it the heat-treated condition provided for in the working schedule. This operation can be referred to as "coil annealing." After such annealing, the coil 143 can now be unwound again as shown in FIGURE 24, and the strip 142 passed through subsequent cold rolling stands 144 by which it is ultimately reduced to the final strip 145 having a thickness of say 0.025 inch, comprising two metal laminations of about 0.012 inch each, separated by an intervening resist layer having a thickness of 0.001 inch or less. This strip can then be passed through an oven 146 for conferring on the material a desirable temper condition for its several parts. From the oven 146 the strip can move through a roller leveler or straightening device 147 which serves to bring the issuing portion 148 of the strip to a plane condition. The strip then passes through the rolls 149 which engage opposite sides, and the edge portions 150 of the stock can be removed, e.g., by tearing while the rest 151 of the strip continues forward between shear blades 152 by which it is severed into sections 153 of predetermined length. In FIGURE 24, the torn edges 150 are shown as guided upward and away from the plane of the residual strip 151, by the rollers 154.

The rolling operations upon the ingot shown as scarved and groove-dressed in FIGURES 17 and 18, produce a multi-wide thin strip 145 as shown in part in FIGURE 25. The anti-welding coatings 98 provided at the edges of the cores, and by the resist material 120 in the external longitudinal grooves of the ingot produce longitudinal notchings 160, 161 which lie substantially in upright planes spaced at predetermined distances from the edges of the residues 163 of the resist material which was placed in the core channels 57 of the ingot. It will be noted that the operations are thus effective to maintain close parallelism of each line of resist material 160, 161, with the adjacent edge of the inter-laminar resist material 163. Therewith, the edge portions 111 of the ingot or billet are successively reduced but remain as solid metal, although the edge may become irregular along its length during rolling. Therewith, when the edge portion, such as the portion 150 in FIGURE 24, is detached along the notching or weakness area at its inner boundary, provided by the residues 160, 161, the remaining strip 151 thus has edges which can be employed for guiding and directing severing and other operations with assurance that the inter-laminar resist residue 163 is at defined distances from such an edge. In FIGURE 25, one edge portion 150 is shown, together with parts of two laminar regions 151a, 151b, central portions of the region 151a being broken away, noting that such a portion may be four or more inches wide between the regions of the notching weaknesses 160, 161, while the total thickness may be 0.025 inch or less. Each laminar region has the metal surface laminations 164, 165 separated by the respective residue 163.

Such rolled strips can be usefully employed in forming tubes and in forming container bodies, as illustrated in FIGURES 27 to 30.

After severing into individual widths, e.g., by flexing along longitudinal lines, until the individual laminar regions break at the weaknesses 160, 161, the individual strips can be severed into blanks 170 of lengths for the tubes or bodies to be made, as shown in FIGURE 27. When two or more cores are employed, the rolled strip can be called "multi-wide" because it can be severed along longitudinal lines into a plurality of individual narrow or "single-wide" strips each having a resist residue 163 enclosed by the metal surface laminations 164, 165 and by the integrating metal connections 166 along the edges. It is preferred to sever the rolled strip transversely, FIGURE 24, into sections 153 which, when the tubular bodies are to be, say, six inches long, may be several units long for conjoint handling. Such sections can be handled in flat condition by printing thereon, prior to the longitudinal breaking and transverse severance into individual blanks.

The two laminations 164, 165 of a blank are now bent apart, FIGURE 28, wherewith re-entrant angles 171 are formed at the edges of the resist layer. This bending of the laminations is continued until the desired tubular internal cross-section is essentially attained, as illustrated in FIGURE 29, where the re-entrant angles 171 are still visible, and the solid metal connecting portions 166 are now present as outwardly projecting fins. With the described practice of employing accurate core pieces, with internal notching present as the residues of the edge coatings 98, trimming is not usually necessary.

The inner surfaces of the tubular body of FIGURE 25 are then supported adjacent the margins of the re-entrant angle portions, and the outer edges of the fins are pressed inward, e.g., by hammering, so that the projections are reduced, as shown in FIGURE 30, for example with the body thickness 172 thereat double or less compared to the thickness of the laminations 164, 165 which provide the major portions of the bodies. Therewith the re-entrant angles 171 are reduced essentially to invisibility, and the body has essentially smooth internal and external surfaces. When employed for container bodies, the ends of the tube may be flanged and provided with container ends by ways known in the art.

In lieu of severance by flexing to effect breakage along the weaknesses 160, 161, the severance of a multi-wide strip into single-wide strips may be effected as shown in FIGURE 26, in which the multi-wide strip 148, FIGURE 24, is delivered between two driven shafts 175, 176 having drums 177 thereon and turning in opposite directions. The strip 148 has the weakness indicated by the longitudinal dotted lines 161, and the drums 177 have widths corresponding to the spacings of the respective pairs of adjacent lines, with the drums staggered as shown. The end of the multi-wide strip is ripped along short distances from its end; so that the marginal portions 150 can be torn away and placed for removal by the rolls 149, and the ends of the narrow or single-wide strips attached alternately to drums 177 on the shafts 175, 176. As the shafts rotate, the multi-wide strip is torn along the weakenings 161, 160 and the resulting single-wide strips are taken up as separate coils on the drums. The shafts 175, 176 are mounted so that they can separate as the coil diameters increase, as shown by the arrows 179 for the shaft 175. The coils can then be removed from the shafts, and later severed transversely into blanks of desired length for opening as set out for FIGURES 28 and 29.

The above illustrations teach the procedure in conjunction with the making of multi-wide laminate strip stock. By providing a single core in an ingot mold, a single-wide laminate strip can be made by the same procedure, and then opened into a tubular body of greater diameter.

It is obvious that the illustrative practices are not restrictive, and that the invention can be practiced in many ways within the scope of the appended claims.

What is claimed is:
1. The method of making tubular bodies of predetermined internal dimensions, which comprises preparing a hollow core of oblong cross-section of a metal compatible with the metal for forming the major portions of the body structure, the interior of the core having accurately predetermined cross-sectional dimensions, providing coatings of first anti-weld material at the exterior edges of the cross-section of the hollow core, mounting the core in a mold and casting said major body metal around the core for welding union therewith and thereby forming a hollow ingot with the said coatings extending in parallelism with and spaced from the channel provided by the interior of the core, providing second anti-welding material in the channel of the ingot, rolling the ingot to provide a strip having metal laminations of said major body metal separated by the residue of the second anti-welding material with the laminations connected at the lateral edges of the second anti-welding residue by metal portions extending from external surface to external surface of the strip and having the residues of said first anti-welding material laterally spaced from the residue of the second anti-welding material, said residues of the first material providing longitudinal weaknesses in the rolled strip, severing the strip longitudinally along the residues of the first material, severing the strip transversely to provide a section of predetermined length, and bending the laminations apart to form the tubular body.

2. The method as in claim 1, in which a plurality of the said cores are provided, with exterior edges of their cross-sections coated with said first anti-welding material, and said cores are abutted in the mold with the anti-welding material present between two abutting cores, whereby the residues of said first material provide internal longitudinal weakenings in the rolled strip between and at predetermined distances from the second anti-weld material residues.

3. The method as in claim 2, in which the mold has inwardly projecting ribs essentially aligned with the said edge coatings of said first material, for providing an ingot having longitudinal external grooves and the edge coatings of said first material essentially aligned therewith.

4. The method as in claim 2, in which the cores are formed as flattened tubes of said compatible metal and of continuous periphery, and the tubes are then internally broached to the predetermined dimensions and the lateral edges of the exterior cross-section are dressed to a thickness dimension between the lateral portions of the interior wall surface and the adjacent dressed exterior surface which is essentially that of the predetermined metal dimension between the edges of the said first and second material residues in the rolled strip.

5. The method of claim 4, and in which the first anti-welding material is applied to the exterior dressed edge surfaces of the cores.

6. The method as in claim 1, in which the core is formed by extruding the said compatible metal as a flattened tube, and thereafter broaching the interior of the tube for establishing the said interior dimensions thereof.

7. The method as in claim 1, in which the core is formed by partly flattening a tubing of said compatible metal between opposed rolls, placing within the tubing a material strip less ductile than the said compatible metal, and further rolling the tubing to produce a flattened tube having internal dimensions less than those determined for the core, and removing the strip.

8. The method as in claim 7, in which three strip members of the less ductile material are juxtaposed and inserted within the partly flattened tubing, the exposed surfaces of the outermost strips being polished, and in which the rolling causes opposed internal surfaces of the tubing to conform to the said exposed surfaces and to become spaced apart a distance determined by the total thickness of the juxtaposed pack, and removing first an intermediate strip member and thereafter the other strip members.

9. The method as in claim 8, in which after removal of the first strip material, a second and wider strip material is inserted and the tubing again rolled for further flattening.

10. The method as in claim 7, in which a sizing tool is passed through the tube, after removal of the strip, for establishing the interior dimensions thereof.

11. The method as in claim 10, in which the flattened tube has flat parallel internal surfaces, and in which the sizing member is a broach for cutting the interior of the tube for form curved surfaces merging with and joining the edges of said flat internal surfaces, said curved surfaces being thereby formed at the predetermined distance apart.

12. The method as in claim 10, in which the strip has polished surfaces for providing polished flat parallel internal surfaces in the flattened tube, and the sizing member is a polished mandrel effective for providing polished curved internal surfaces merging with said flat surfaces.

13. The method of making tubular bodies of accurately predetermined dimensions, which comprises preparing a plurality of hollow cores of a metal compatible with the metal for forming the major portion of the body structure, the interior of each core having accurately predetermined dimensions, coating the exterior lateral edges of the cross-sections of the cores with first weld-preventing material, mounting the cores in a mold with said coated edges abutting one another, casting said major body metal around the cores for welding union therewith at surfaces not coated with the first anti-welding material and thereby forming an ingot having a plurality of empty internal channels extending along its length and with said first material present between and spaced from said channels, placing second anti-welding material in each of the channels, rolling the ingot to provide a strip having metal laminations of said major body metal and core metal, said laminations being at opposite surfaces of the strip and separated by the residues of the second anti-welding material in the channels and connected at the edges of said second material residues by rolled metal from the ends of the cores, said rolled metal at each end of a core being separated from the rolled end metal of the adjacent core by the residue of said first anti-welding material coating, stressing the strip along longitudinal lines adjacent each of said coating residues whereby to provoke severance along said coating residues, and bending the laminations aparts to form the tubular bodies.

14. The method as in claim 13, in which the ingot is provided with external surfaces for contact with the rolls, said surfaces being spaced farther apart at the center of width than adjacent the edges, for compensating differential lateral spread during rolling.

15. The method as in claim 13, in which the ingot is provided with longitudinal external grooves located in pairs with each pair essentially aligned with the first anti-welding material at the edge of a core.

16. The method as in claim 15, in which a coating of third anti-welding material is applied at a surface of each longitudinal groove.

17. The method as in claim 15, in which one pair of grooves is present between an edge of the ingot and the adjacent edge of a core, for defining after rolling a weakness in the strip parallel to and at a predetermined distance from the adjacent edge of a second anti-welding residue of the corresponding lateral channel.

18. The method as in claim 17, in which the edge of the rolled laminate strip material is ripped along the said weakness to provide an edge parallel to the said second anti-welding residue, and in which the laminate material is severed transversely at a predetermined angle to said parallel edge prior to bending the laminations apart.

19. The method as in claim 13, in which the rolled laminate strip material is severed transversely into sections at intervals which are multiples of the length of the tubular bodies to be made, and thereafter the sections are parted along the weakenings intermediate adjacent second anti-welding residues and severed to individual blank lengths, and said blanks are then expanded by bending the laminations.

20. The method of making tubular bodies of predetermined internal dimensions, which comprises preparing a plurality of hollow cores of oblong cross-section of a metal different from and compatible with the metal for forming the major portions of the body structure, the interior of the core having accurately predetermined dimensions, providing a coating of anti-welding material on at least one outer edge of each core, mounting the cores in a mold with said core edges in abutment with a said outer edge coating between each two adjacent cores, casting said major body metal around the cores for welding union and integration therewith and thereby forming an ingot having a plurality of internal hollows as longitudinally extending and laterally spaced channels therein, providing anti-welding material in the channels of the ingot, rolling the ingot to provide a strip having laterally spaced sets of metal laminations of said major body metal and said core metal separated by the residues of the anti-welding material provided in said channels with the laminations connected at the edges of the said channel anti-welding residues by metal portions extending from the external surface to external surface of the strip, whereby the residues of said edge coating provide internal longitudinal weakenings in the rolled strip at predetermined distances from the anti-welding material residues, severing the strip longitudinally along the said internal longitudinal weakenings and severing the strip transversely to provide sections of predetermined length and each having a single said channel anti-welding residue therein, and bending the laminations of said sections apart to form the tubular bodies, the rolled metal of the integrated cores being effective as a cladding at the internal surfaces of the hollow bodies.

References Cited in the file of this patent
UNITED STATES PATENTS

| | | |
|---|---|---|
| 281,184 | Greer | July 10, 1883 |
| 377,316 | Marshall | Jan. 31, 1388 |
| 677,986 | Hobel | July 9, 1901 |
| 1,711,974 | Snelling | May 7, 1929 |
| 2,008,626 | Murakami | July 16, 1935 |
| 2,522,780 | Dickson | Sept. 19, 1950 |
| 2,950,512 | Wilkins | Aug. 30, 1960 |
| 2,983,994 | Johnson | May 16, 1961 |
| 3,029,155 | Maier et al. | Apr. 10, 1962 |

FOREIGN PATENTS

| | | |
|---|---|---|
| 205,695 | Australia | Jan. 10, 1957 |

OTHER REFERENCES

Materials and Methods, August 1955, "Impact (Cold) Extruded Parts," Reinhold Publishing Corporation, 430 Park Avenue, New York 22, New York, pages 111–126 relied on.